US012332586B2

(12) United States Patent
Baba et al.

(10) Patent No.: US 12,332,586 B2
(45) Date of Patent: Jun. 17, 2025

(54) TRANSFER DEVICE AND IMAGE FORMING APPARATUS

(71) Applicant: FUJIFILM Business Innovation Corp., Tokyo (JP)

(72) Inventors: Toshiaki Baba, Kanagawa (JP); Yoko Miyamoto, Kanagawa (JP); Tomohiro Wada, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/432,648

(22) Filed: Feb. 5, 2024

(65) Prior Publication Data

US 2025/0053120 A1 Feb. 13, 2025

(30) Foreign Application Priority Data

Aug. 9, 2023 (JP) ................................ 2023-130496

(51) Int. Cl.
*G03G 15/01* (2006.01)
*G03G 15/16* (2006.01)

(52) U.S. Cl.
CPC . *G03G 15/1615* (2013.01); *G03G 2215/1623* (2013.01)

(58) Field of Classification Search
CPC ............... G03G 15/08; G03G 15/0872; G03G 15/1615; G03G 21/1647
USPC ........................................ 399/121, 302, 308
See application file for complete search history.

(56) References Cited

FOREIGN PATENT DOCUMENTS

| | | | |
|---|---|---|---|
| JP | 2009-080325 A | | 4/2009 |
| JP | 2017015981 | * | 1/2017 |

* cited by examiner

*Primary Examiner* — Hoan H Tran
(74) *Attorney, Agent, or Firm* — Sughrue Mion, PLLC

(57) ABSTRACT

A transfer device includes: an endless transfer belt that circulates and receives an image; one image carrier that carries an image and is in contact with an outer circumferential surface of the transfer belt from above; another image carrier that carries an image and is in contact with the outer circumferential surface of the transfer belt from below; one transfer roller that holds the transfer belt with respect to the one image carrier to transfer the image carried on the one image carrier to the transfer belt, the one transfer roller including one cylindrical roller part; and another transfer roller that holds the transfer belt with respect to the other image carrier to transfer the image carried on the other image carrier to the transfer belt, the other transfer roller including another cylindrical roller part. The one roller part and the other roller part protrude at central portions thereof in the axial direction with respect to ends thereof in the axial direction. The amount of protrusion at the central portion of the other roller part is smaller than the amount of protrusion at the central portion of the one roller part.

10 Claims, 6 Drawing Sheets

TRANSFER DEVICE AND IMAGE FORMING APPARATUS

CROSS-REFERENCE TO RELATED APPLICATIONS

This application is based on and claims priority under 35 USC 119 from Japanese Patent Application No. 2023-130496 filed Aug. 9, 2023.

BACKGROUND

(i) Technical Field

The present disclosure relates to a transfer device and an image forming apparatus.

(ii) Related Art

An image forming apparatus described in Japanese Unexamined Patent Application Publication No. 2009-80325 includes multiple image forming units, a transfer belt member, multiple stretching members, first transfer members, a second transfer member, and a fixing unit.

The image forming units form visible images by allowing charged developer to adhere to electrostatic latent images. The visible images formed by the image forming units are transferred to the transfer belt member. The transfer belt member is stretched over the stretching members. The first transfer members transfer the visible images formed by the image forming units to the transfer belt member. The second transfer member transfers the visible image transferred to the transfer belt member to a recording medium. The fixing unit fixes the visible image transferred to the recording medium. The image forming units are arranged in two or more transfer areas defined by the transfer belt member and the stretching members.

SUMMARY

A transfer device includes multiple image carriers arranged side-by-side in a direction in which the transfer belt runs, and transfer rollers disposed on the other side of the transfer belt from the image carriers.

At this time, one transfer roller and another transfer roller may be provided. The one transfer roller is disposed on the other side of the transfer belt from one image carrier that is in contact with the outer circumferential surface of the transfer belt from above. The other transfer roller is disposed on the other side of the transfer belt from another image carrier that is in contact with the outer circumferential surface of the transfer belt from below.

With this structure, when the shape of the one transfer roller and the shape of the other transfer roller are the same, a difference occurs between: the pressure generated between the one transfer roller and the one image carrier at the central portion in the axial direction; and the pressure generated between the other transfer roller and the other image carrier at the central portion in an axial direction, due to deflection of the transfer rollers caused by gravity.

Aspects of non-limiting embodiments of the present disclosure relate to reducing the difference between: the pressure generated between the one transfer roller and the one image carrier at the central portion in the axial direction; and the pressure generated between the other transfer roller and the other image carrier at the central portion in the axial direction, compared with a case where the shape of the one transfer roller and the shape of the other transfer roller are the same.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a transfer device including: an endless transfer belt that circulates and receives an image; one image carrier that carries an image and is in contact with an outer circumferential surface of the transfer belt from above; another image carrier that carries an image and is in contact with the outer circumferential surface of the transfer belt from below; one transfer roller that holds the transfer belt with respect to the one image carrier to transfer the image carried on the one image carrier to the transfer belt, the one transfer roller including one cylindrical roller part; and another transfer roller that holds the transfer belt with respect to the other image carrier to transfer the image carried on the other image carrier to the transfer belt, the other transfer roller including another cylindrical roller part. The one roller part and the other roller part protrude at central portions thereof in the axial direction with respect to ends thereof in the axial direction. The amount of protrusion at the central portion of the other roller part is smaller than the amount of protrusion at the central portion of the one roller part.

BRIEF DESCRIPTION OF THE DRAWINGS

Exemplary embodiment of the present disclosure will be described in detail based on the following figures, wherein.

DETAILED DESCRIPTION

Figure 1:
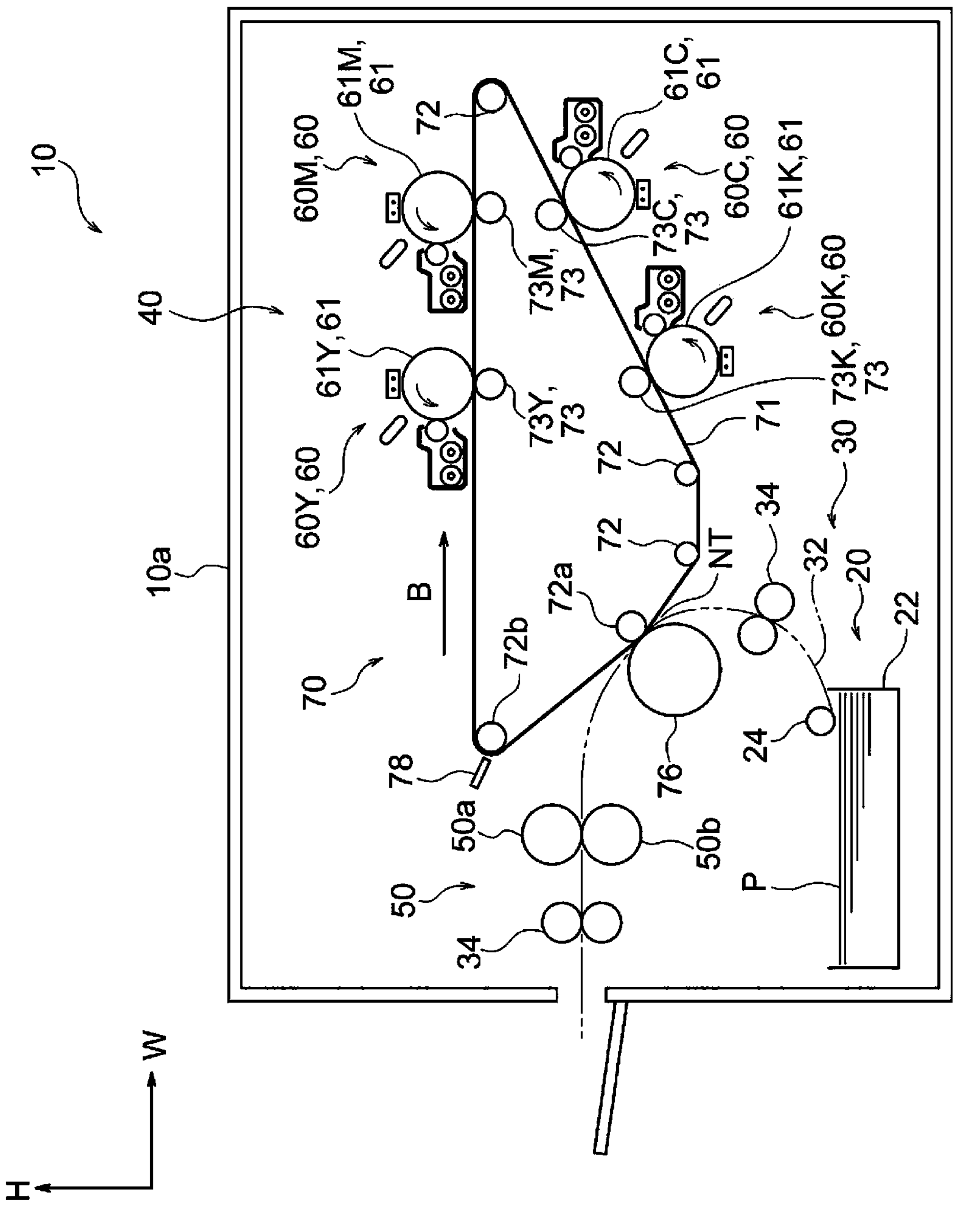
FIG. 1 schematically illustrates the structure of an image forming apparatus according to an exemplary embodiment of the present disclosure.

An example of transfer device and an example of image forming apparatus according to an exemplary embodiment of the present disclosure will be described with reference to FIGS. 1 to 6. In the drawings, the arrow H indicates the apparatus top-bottom direction (vertical direction), the arrow W indicates the apparatus width direction (horizontal direction), and the arrow D indicates the apparatus depth direction (horizontal direction).

Image Forming Apparatus

An image forming apparatus 10 according to this exemplary embodiment is an electrophotographic image forming apparatus that forms a toner image on a sheet member P, serving as a recording medium. As illustrated in FIG. 1, the image forming apparatus 10 includes a storage section 20, a transport section 30, an image forming section 40, and a fixing device 50.

Storage Section and Transport Section

The storage section 20 includes a storage member 22 that stores sheet members P, and a feed roller 24 that feeds the sheet members P stored in the storage member 22 to a sheet transport path 32. The transport section 30 includes multiple transport rollers 34 that transport the sheet members P along the transport path 32.

Image Forming Section

The image forming section 40 includes toner-image forming units 60 that form toner images, and a transfer device 70 that transfers the toner images formed by the toner-image forming units 60 to a sheet member P.

Toner-Image Forming Unit

The toner-image forming units 60 include toner-image forming units 60Y, 60M, 60C, and 60K corresponding to a total of four colors, namely, yellow (Y), magenta (M), cyan (C), and black (K). Note that alphabet letters appended to the reference signs may be omitted when Y, M, C, and K are not distinguished from one another.

The toner-image forming units 60Y and 60M have basically the same structure except for the toners used. The toner-image forming units 60C and 60K have basically the same structure except for the toners used.

Figure 2:
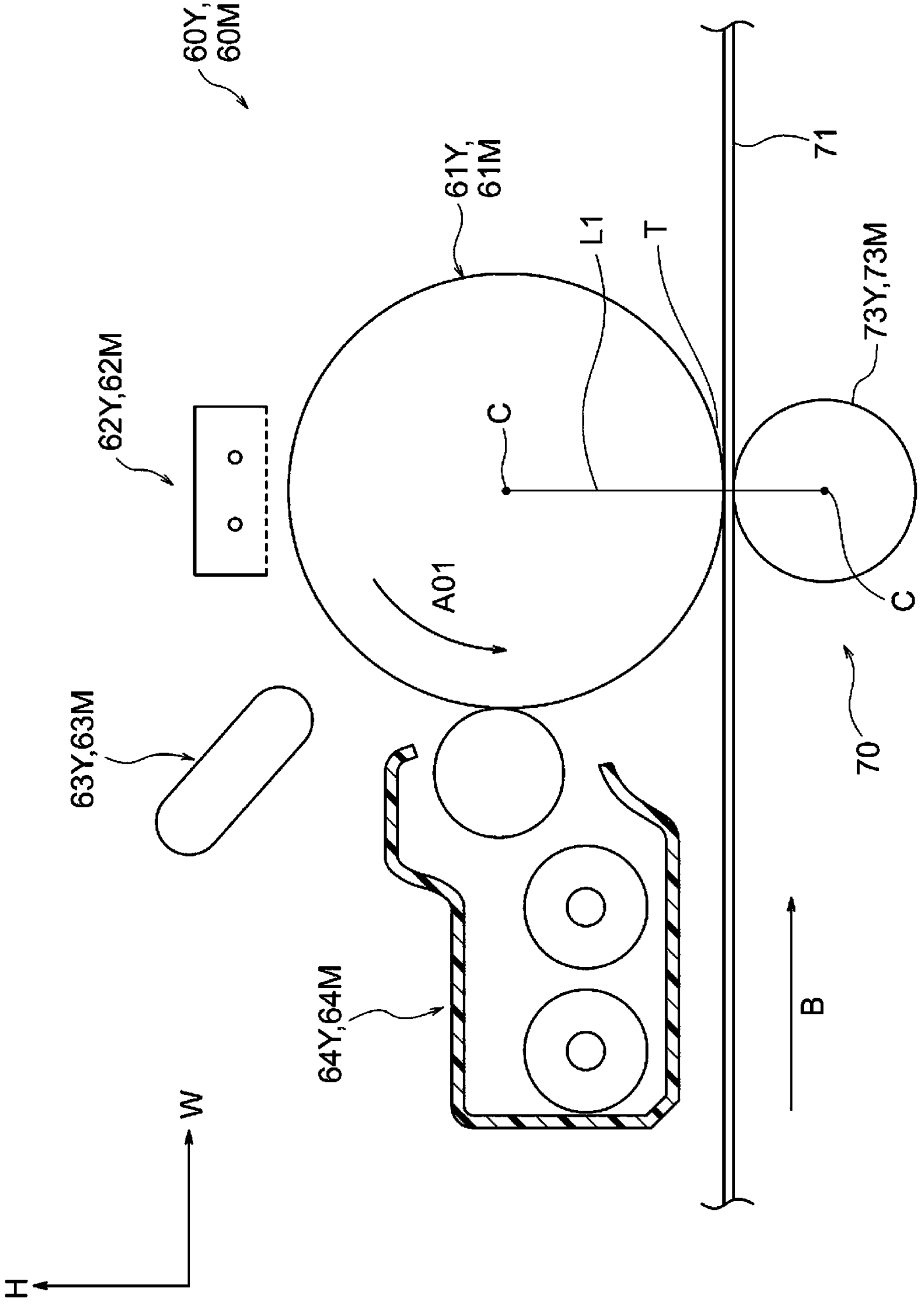
FIG. 2 schematically illustrates the structure of a transfer device according to the exemplary embodiment of the present disclosure.
Figure 3:
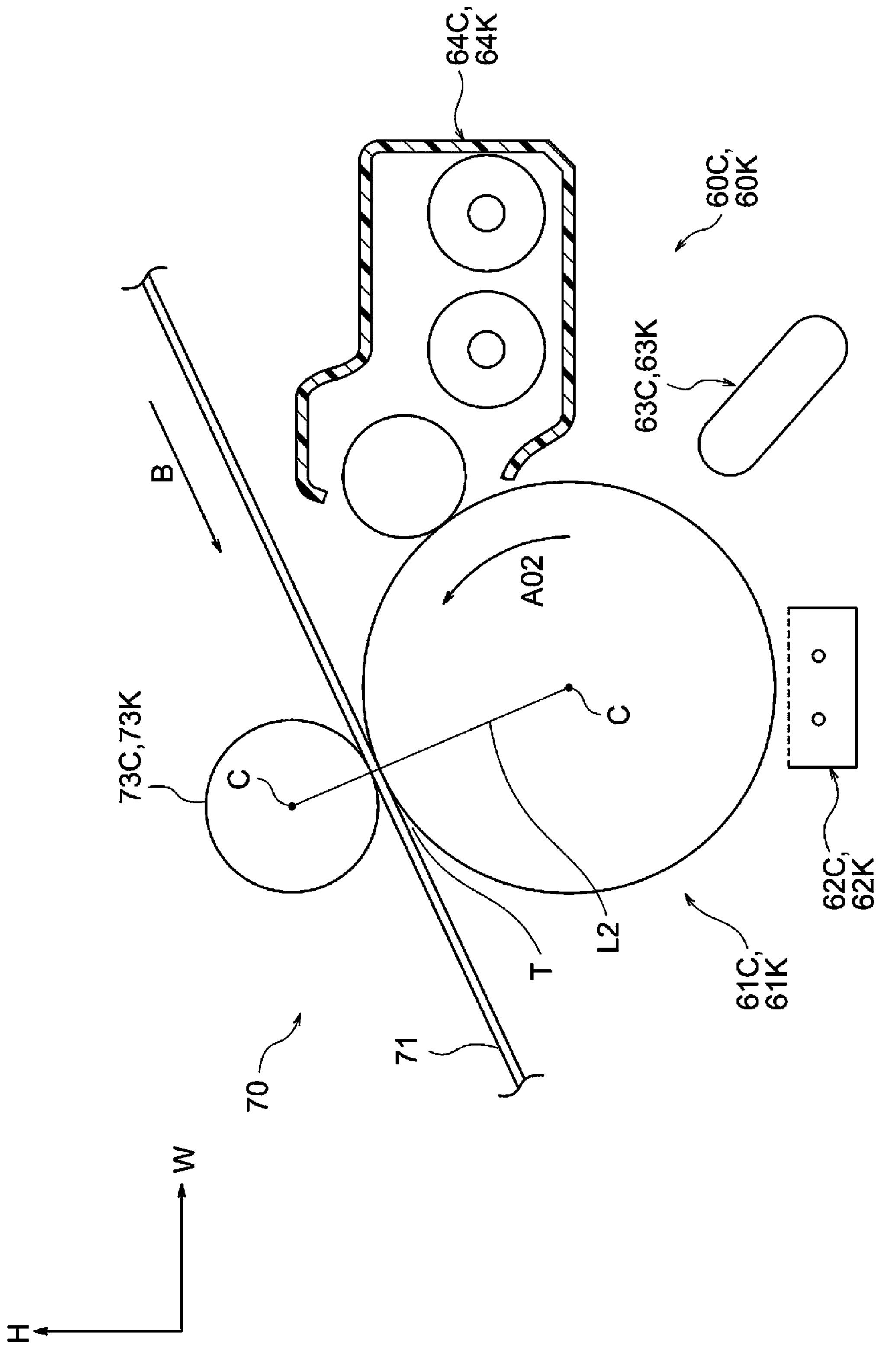
FIG. 3 schematically illustrates the structure of another transfer device according to the exemplary embodiment of the present disclosure.

As illustrated in FIGS. 1 and 2, the toner-image forming units 60Y and 60M are arranged side-by-side along a horizontal portion of a transfer belt 71 provided in the transfer device 70. As illustrated in FIGS. 1 and 3, the toner-image forming units 60C and 60K are arranged side-by-side along an inclined portion of the transfer belt 71 provided in the transfer device 70.

As illustrated in FIG. 2, the toner-image forming units 60Y and 60M include photosensitive members 61Y and 61M that rotate in the arrow A01 direction and are in contact with the outer circumferential surface of the transfer belt 71 from above, and charging devices 62Y and 62M that charge the photosensitive members 61Y and 61M.

The toner-image forming units 60Y and 60M also include exposure devices 63Y and 63M that radiate light onto the photosensitive members 61Y and 61M charged by the charging devices 62Y and 62M to form electrostatic latent images, and developing devices 64Y and 64M that develop the electrostatic latent images with toner to form toner images.

As illustrated in FIG. 3, the toner-image forming units 60C and 60K include photosensitive members 61C and 61K that rotate in the arrow A02 direction and are in contact with the outer circumferential surface of the transfer belt 71 from below, and charging devices 62C and 62K that charge the photosensitive members 61C and 61K.

The toner-image forming units 60C and 60K include exposure devices 63C and 63K that radiate light onto the photosensitive members 61C and 61K charged by the charging devices 62C and 62K to form electrostatic latent images, and developing devices 64C and 64K that develop the electrostatic latent images with toner to form toner images.

Transfer Device

As illustrated in FIG. 1, the transfer device 70 includes the photosensitive members 61Y, 61M, 61C, and 61K, the transfer belt 71, multiple rollers 72, first transfer rollers 73Y, 73M, 73C, and 73K, a second transfer roller 76, and a removal blade 78. As described, the photosensitive members 61Y, 61M, 61C, and 61K constitute the transfer device 70 and, at the same time, constitute the toner-image forming unit 60.

In this structure, the first transfer rollers 73Y, 73M, 73C, and 73K transfer the toner images held on the photosensitive members 61Y, 61M, 61C, and 61K to the running transfer belt 71. Furthermore, the second transfer roller 76 transfers the toner image transferred to the transfer belt 71 to a sheet member P being transported. The transfer device 70 will be described in detail below.

Fixing Device

As illustrated in FIG. 1, the fixing device 50 includes a heating roller 50*a* that rotates, and a pressure roller 50*b* that is rotated by the heating roller 50*a* and presses the sheet member P against the heating roller 50*a* while nipping the sheet member P between the heating roller 50*a* and the pressure roller 50*b*. The fixing device 50 is an example of fixing unit.

With this structure, the fixing device 50 applies heat and pressure to the sheet member P having the toner image transferred thereto to fix the toner image to the sheet member P. The sheet member P having the toner image fixed thereto is discharged to the outside of a housing 10*a* of the image forming apparatus 10.

Relevant Part Structure

Next, the transfer device 70 will be described. As described above, the transfer device 70 includes the photosensitive members 61Y, 61M, 61C, and 61K, the transfer belt 71, the rollers 72, the first transfer rollers 73Y, 73M, 73C, and 73K, the second transfer roller 76, and the removal blade 78. The photosensitive members 61Y and 61M are an example of one image carrier, and the photosensitive members 61C and 61K are an example of another image carrier. The first transfer rollers 73Y and 73M are an example of one transfer roller, and the first transfer rollers 73C and 73K are an example of another transfer roller.

Photosensitive Member

The photosensitive members 61Y, 61M, 61C, and 61K have a circular cross section. All the photosensitive members 61Y, 61M, 61C, and 61K have the same outer diameter. In other words, the photosensitive members 61Y, 61M, 61C, and 61K all have the same shape.

As illustrated in FIG. 2, the photosensitive members 61Y and 61M are in contact with the outer circumferential surface of the transfer belt 71 from above. As illustrated in FIG. 3, the photosensitive members 61C and 61K are in contact with the outer circumferential surface of the transfer belt 71 from below.

Transfer Belt, Rollers, Second Transfer Roller, and Removal Blade

As illustrated in FIG. 1, the transfer belt 71 is an endless belt wound around the rollers 72 in an inverted triangular form. The toner-image forming units 60Y and 60M are arranged side-by-side along the horizontal portion on the upper side of the transfer belt 71, and the toner-image forming units 60C and 60K are arranged side-by-side along the inclined portion of the transfer belt 71 on one side (right side in FIG. 1) in the apparatus width direction. The transfer belt 71 runs in the arrow B direction when at least one of the rollers 72 is rotationally driven.

The second transfer roller 76 is disposed on the other side of the transfer belt 71 from the roller 72 (the roller 72*a* in FIG. 1) that is disposed so as to push outward an inclined portion of the transfer belt 71 on the other side (left side in FIG. 1) in the apparatus width direction. The second transfer roller 76 transfers a toner image, which has been transferred to the transfer belt 71, to a sheet member P being transported, at a transfer position NT.

The removal blade 78 is disposed on the other side of the transfer belt 71 from the roller 72 (the roller 72*b* in FIG. 2) around which a portion of the transfer belt 71 on the other side in the apparatus width direction is wound. The removal blade 78 removes substance deposited on the transfer belt 71 from the transfer belt 71.

First Transfer Rollers

As illustrated in FIG. 2, the first transfer rollers 73Y and 73M are disposed on the other side of the transfer belt 71 from the photosensitive members 61Y and 61M so as to hold the transfer belt 71 with respect to the photosensitive members 61Y and 61M from below the transfer belt 71.

What is meant by that the first transfer rollers 73Y and 73M hold the transfer belt 71 with respect to the photosensitive members 61Y and 61M from below the transfer belt 71 is that the first transfer rollers 73Y and 73M are disposed below the photosensitive members 61Y and 61M, respectively, when viewed from the apparatus depth direction. Specifically, the first transfer rollers 73Y and 73M are disposed below the photosensitive members 61Y and 61M in a state in which line segments L1 connecting the centers C of the first transfer rollers 73Y and 73M and the centers C of the photosensitive members 61Y and 61M are inclined at at least 15° with respect to the horizontal direction. In this exemplary embodiment, for example, the line segments L1 are inclined by 90° with respect to the horizontal direction.

Figure 4:
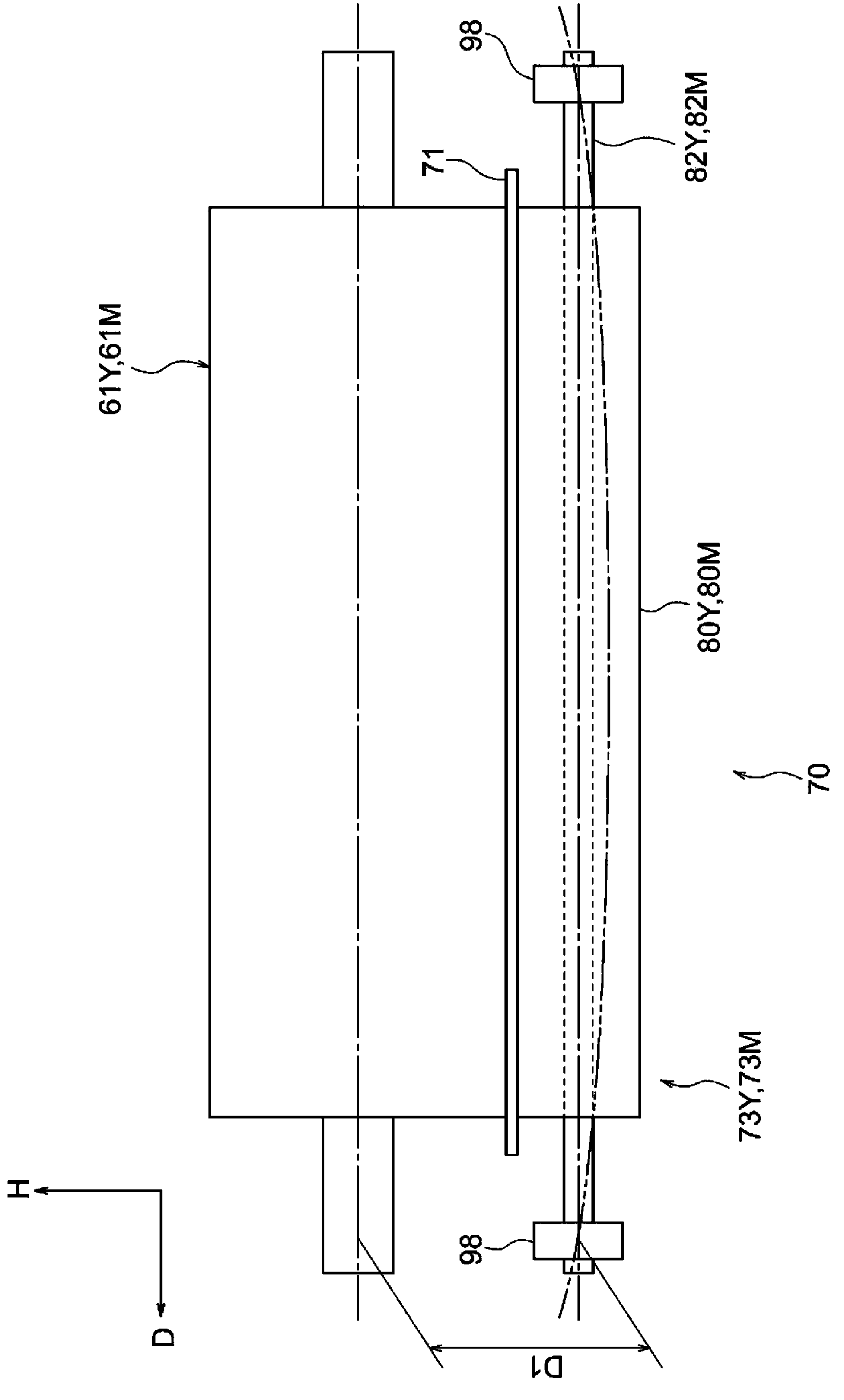
FIG. 4 schematically illustrates the structure of a photosensitive member and a first transfer roller in the transfer device according to the exemplary embodiment of the present disclosure.

As illustrated in FIG. 4, the first transfer rollers 73Y and 73M include elastic cylindrical roller parts 80Y and 80M, and shafts 82Y and 82M made of stainless steel and inserted through the roller parts 80Y and 80M so as to protrude outside from the ends of the roller parts 80Y and 80M.

The first transfer rollers 73Y and 73M are rotatably supported by support members 98 disposed at the ends of the shafts 82Y and 82M. This allows the first transfer rollers 73Y and 73M to be rotated by the running transfer belt 71.

Meanwhile, as illustrated in FIG. 3, the first transfer rollers 73C and 73K are disposed on the other side of the transfer belt 71 from the photosensitive members 61C and 61K so as to hold the transfer belt 71 with respect to the photosensitive members 61C and 61K from above the transfer belt 71.

What is meant by that the first transfer rollers 73C and 73K hold the transfer belt 71 with respect to the photosensitive members 61C and 61K from above the transfer belt 71 is that the first transfer rollers 73C and 73K are disposed above the photosensitive members 61C and 61K, respectively, when viewed from the apparatus depth direction. Specifically, the first transfer rollers 73C and 73K are disposed above the photosensitive members 61C and 61K in a state in which line segments L2 connecting the centers C of the first transfer rollers 73C and 73K and the centers C of the photosensitive members 61C and 61K are inclined at at least 15° with respect to the horizontal direction. In this exemplary embodiment, for example, the line segments L2 are inclined at 65° with respect to the horizontal direction.

Figure 5:
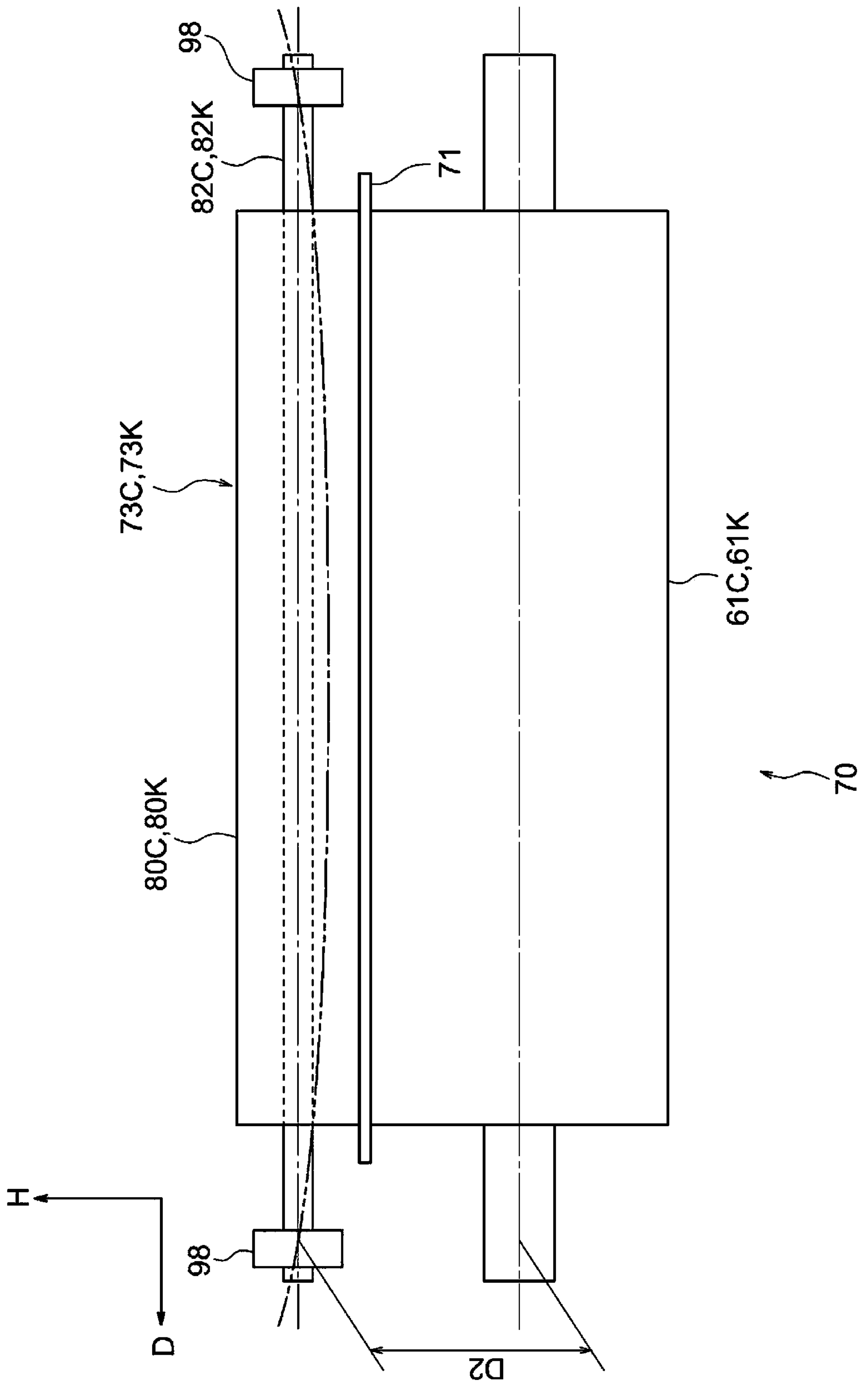
FIG. 5 schematically illustrates the structure of a photosensitive member and a first transfer roller in the other transfer device according to the exemplary embodiment of the present disclosure.

As illustrated in FIG. 5, the first transfer rollers 73C and 73K include clastic cylindrical roller parts 80C and 80K, and shafts 82C and 82K made of stainless steel and are inserted through the roller parts 80C and 80K so as to protrude outside from the ends of the roller parts 80C and 80K.

The first transfer rollers 73C and 73K are rotatably supported by support members 98 disposed at the ends of the shafts 82C and 82K. This allows the first transfer rollers 73C and 73K to be rotated by the running transfer belt 71.

At this time, the first transfer rollers 73Y and 73M supported at support points, which are the support members 98, sag due to gravity, as indicated by a two-dot chain line in FIG. 4. Hence, the distance between the first transfer rollers 73Y and 73M and the photosensitive members 61Y and 61M at the central portions thereof in the axial direction is larger than that in the case where the first transfer rollers do not sag. Meanwhile, the first transfer rollers 73C and 73K supported at support points, which are the support members 98, sag due to gravity, as indicated by a two-dot chain line in FIG. 5. Hence, the distance between the first transfer rollers 73C and 73K and the photosensitive members 61C and 61K at the central portions thereof in the axial direction is larger than that in the case where the first transfer rollers do not sag.

The two-dot chain lines in FIGS. 4 and 5 representing the sag are exaggerated for better understanding of the sag.

For these reasons, the pressure generated between the first transfer rollers 73Y and 73M and the photosensitive members 61Y and 61M at the central portions thereof in the axial direction may be weaker than the pressure generated between the first transfer rollers 73C and 73K and the photosensitive members 61C and 61K at the central portions thereof in the axial direction.

Figure 6A:
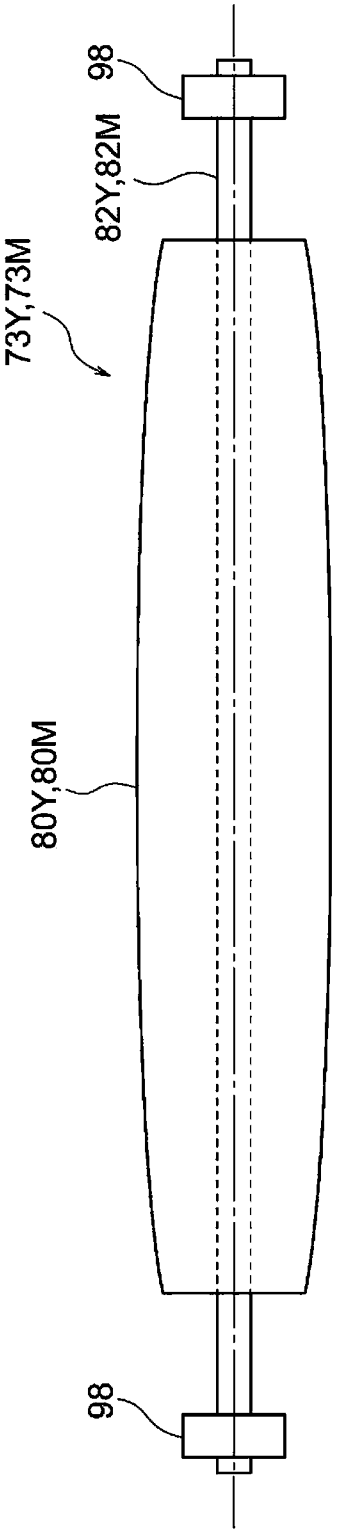
FIGS. 6A and 6B illustrate roller parts and the like of the transfer devices according to the exemplary embodiment of the present disclosure.

However, as illustrated in FIG. 6A, in the first transfer rollers 73Y and 73M, the outer diameter of the central portion of the roller parts 80Y and 80M in the axial direction is larger than the outer diameter of the ends of the roller parts 80Y and 80M in the axial direction. The outer circumferential surfaces of the roller parts 80Y and 80M are each formed of a single convex surface. As described, the outer circumferential surfaces of the roller parts 80Y and 80M have a positive crown shape. The ends of the roller parts 80 in the axial direction are the ends of the outer circumferential surfaces of the roller parts 80 in the axial direction. The central portion of the roller parts 80 in the axial direction is the portion where the distance from one end in the axial direction and the distance from the other end in the axial direction are equal.

Figure 6B:
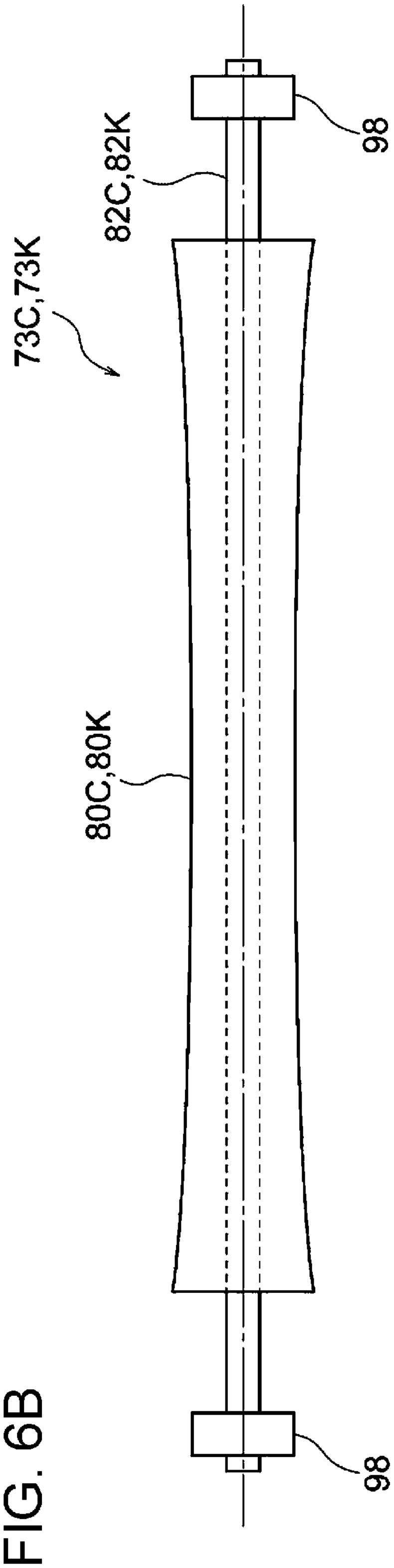

Meanwhile, as illustrated in FIG. 6B, in the first transfer rollers 73C and 73K, the outer diameter of the central portion of the roller parts 80C and 80K in the axial direction is smaller than the outer diameter of the ends of the roller parts 80C and 80K in the axial direction. The outer circumferential surfaces of the roller parts 80C and 80K are each formed of a single concave surface. As described, the outer circumferential surfaces of the roller parts 80C and 80K have a negative crown shape. The outer diameter of the ends of the roller parts 80C and 80K in the axial direction is equal to the outer diameter of the ends of the roller parts 80Y and 80M in the axial direction. The crown shapes illustrated in FIGS. 6A and 6B are exaggerated for better understanding of the crown shapes.

Furthermore, the distance (D1 in FIG. 4) between the center of the shafts 82Y and 82M, at the portion supported by the support member 98, and the axis of the photosensitive members 61Y and 61M is shorter than the distance (D2 in FIG. 5) between the center of the shafts 82C and 82K, at the portion supported by the support member 98, and the axis of the photosensitive members 61C and 61K. The distances D1 and D2 may be measured by using, for example, a three-dimensional measurement device.

As described above, in the first transfer rollers 73Y and 73M of the transfer device 70, the outer diameter of the central portion of the roller parts 80Y and 80M in the axial direction is larger than the outer diameter of the ends of the roller parts 80Y and 80M in the axial direction. Furthermore, in the first transfer rollers 73C and 73K, the outer diameter of the central portion of the roller parts 80C and 80K in the axial direction is smaller than the outer diameter of the ends of the roller parts 80C and 80K in the axial direction. Hence, compared with the case where the shape of the roller parts 80Y and 80M of the first transfer rollers 73Y and 73M and the shape of the roller parts 80C and 80K of the first transfer rollers 73C and 73K are the same, the difference between: the pressure generated between the first transfer rollers 73Y and 73M and the photosensitive members 61Y and 61M at the central portions thereof in the axial direction; and the pressure generated between the first transfer rollers 73C and 73K and the photosensitive members 61C and 61K at the central portions thereof in the axial direction, is small.

In the transfer device 70, the outer circumferential surfaces of the roller parts 80Y and 80M and the outer circumferential surfaces of the roller parts 80C and 80K are curved surfaces. Thus, compared with the case where the roller parts include steps, the pressure generated between the first transfer roller 73 and the photosensitive member 61 gradually changes in the axial direction.

Furthermore, in the transfer device 70, the outer circumferential surfaces of the roller parts 80Y and 80M have a positive crown shape, and the outer circumferential surfaces of the roller parts 80C and 80K have a negative crown shape. In other words, the amount of protrusion of the roller parts 80Y and 80M is positive, and the amount of protrusion of the roller parts 80C and 80K is negative. Hence, compared with a case where the amount of protrusion of both roller parts is positive or a case where the amount of protrusion of both roller parts is negative, the difference between: the pressure generated between the first transfer rollers 73Y and 73M and the photosensitive members 61Y and 61M at the central portions thereof in the axial direction; and the pressure generated between the first transfer rollers 73C and 73K and the photosensitive members 61C and 61K at the central portions thereof in the axial direction, is small. At this time, the magnitude of the amount of protrusion is not the magnitude of absolute values, but the magnitude including positive and negative values.

In the transfer devices 70, the outer diameter of the photosensitive members 61Y and 61M and the outer diameter of the photosensitive members 61C and 61K are the same.

Furthermore, in the transfer device 70, the distance (D1 in FIG. 4) between the center of the shafts 82Y and 82M, at the portion supported by the support member 98, and the axis of the photosensitive members 61Y and 61M is shorter than the distance (D2 in FIG. 5) between the center of the shafts 82C and 82K, at the portion supported by the support member 98, and the axis of the photosensitive members 61C and 61K.

The image forming apparatus 10 includes the transfer device 70.

Although a specific exemplary embodiment of the present disclosure has been described in detail above, the present disclosure is not limited to this exemplary embodiment, and it is apparent to those skilled in the art that various other exemplary embodiments are possible within the scope of the present disclosure. For example, although the outer circumferential surfaces of the roller parts 80 are curved surfaces in the exemplary embodiment, the roller parts may have corners, steps, or the like. In that case, however, the advantage provided by the roller parts 80 having curved outer circumferential surfaces is not obtained.

In the exemplary embodiment described above, the amount of protrusion of the roller parts 80Y and 80M is positive, and the amount of protrusion of the roller parts 80C and 80K is negative. Instead, the amount of protrusion of both roller parts may be positive, the amount of protrusion of both roller parts may be negative, or the amount of protrusion of either the roller parts 80Y and 80M or the roller parts 80C and 80K may be zero. However, in that case, the advantage provided by the roller parts 80Y and 80M having positive amount of projection and the roller parts 80C and 80K having negative amount of projection is not obtained.

Furthermore, in the above-described exemplary embodiment, the distance (D1 in FIG. 4) between the center of the shafts 82Y and 82M, at the portion supported by the support member 98, and the axis of the photosensitive members 61Y and 61M is shorter than the distance (D2 in FIG. 5) between the center of the shafts 82C and 82K, at the portion supported by the support member 98, and the axis of the photosensitive members 61C and 61K. However, the distances D1 and D2 may be equal. In that case, however, the advantage provided by the distance D1 being shorter than the distance D2 is not obtained.

Although not particularly described in the above-described exemplary embodiment, the pressure generated between the second transfer roller 76 and the roller 72*a* is higher than the pressure generated between the first transfer rollers 73 and the photosensitive members 61.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

A transfer device including: an endless transfer belt that circulates and receives an image; one image carrier that carries an image and is in contact with an outer circumferential surface of the transfer belt from above; another image carrier that carries an image and is in contact with the outer circumferential surface of the transfer belt from below; one transfer roller that holds the transfer belt with respect to the one image carrier to transfer the image carried on the one image carrier to the transfer belt, the one transfer roller including one cylindrical roller part; and another transfer roller that holds the transfer belt with respect to the other image carrier to transfer the image carried on the other image carrier to the transfer belt, the other transfer roller including another cylindrical roller part, wherein the one roller part and the other roller part protrude at central portions thereof in an axial direction with respect to ends thereof in the axial direction, and the amount of protrusion at the central portion of the other roller part is smaller than the amount of protrusion at the central portion of the one roller part.

(((2)))

The transfer device according to (((1))), wherein the outer circumferential surface of the one roller part and the outer circumferential surface of the other roller part are curved surfaces.

(((3)))

The transfer device according to (((1))) or (((2))), wherein the amount of protrusion of the one roller part is positive, and the amount of protrusion of the other roller part is negative.

(((4)))

The transfer device according to any one of (((1))) to (((3))), wherein the outer diameter of the one image carrier and the outer diameter of the other image carrier are the same.

(((5)))

The transfer device according to any one of (((1))) to (((4))), wherein the one transfer roller includes one shaft member inserted through the first roller part and protruding from both ends of the first roller part, the other transfer roller includes another shaft member inserted through the other roller part and protruding from both ends of the other roller part, and the distance between the center of the one shaft member, at a portion where the one shaft member is supported, and the axis of the one image carrier is shorter than the distance between the center of the other shaft member, at a portion where the other shaft member is supported, and the axis of the other image carrier.

(((6)))

An image forming apparatus including: the transfer device according to any one of (((1))) to (((5))); and a fixing unit that fixes the image transferred to a recording medium by the transfer device to the recording medium.

What is claimed is:

1. A transfer device comprising:

an endless transfer belt that circulates and receives an image;

one image carrier that carries an image and is in contact with an outer circumferential surface of the transfer belt from above;

another image carrier that carries an image and is in contact with the outer circumferential surface of the transfer belt from below;

one transfer roller that holds the transfer belt with respect to the one image carrier to transfer the image carried on the one image carrier to the transfer belt, the one transfer roller including one cylindrical roller part; and another transfer roller that holds the transfer belt with respect to the other image carrier to transfer the image carried on the other image carrier to the transfer belt, the other transfer roller including another cylindrical roller part, wherein the one roller part and the other roller part protrude at central portions thereof in an axial direction with respect to ends thereof in the axial direction, and the amount of protrusion at the central portion of the other roller part is smaller than the amount of protrusion at the central portion of the one roller part.

2. The transfer device according to claim 1, wherein the outer circumferential surface of the one roller part and the outer circumferential surface of the other roller part are curved surfaces.

3. The transfer device according to claim 2, wherein the amount of protrusion of the one roller part is positive, and the amount of protrusion of the other roller part is negative.

4. An image forming apparatus comprising:

the transfer device according to claim 3; and a fixing unit that fixes the image transferred to a recording medium by the transfer device to the recording medium.

5. An image forming apparatus comprising:

the transfer device according to claim 2; and a fixing unit that fixes the image transferred to a recording medium by the transfer device to the recording medium.

6. The transfer device according to claim 1, wherein the outer diameter of the one image carrier and the outer diameter of the other image carrier are the same.

7. The transfer device according to claim 6, wherein the one transfer roller includes one shaft member inserted through the first roller part and protruding from both ends of the first roller part, the other transfer roller includes another shaft member inserted through the other roller part and protruding from both ends of the other roller part, and the distance between the center of the one shaft member, at a portion where the one shaft member is supported, and the axis of the one image carrier is shorter than the distance between the center of the other shaft member, at a portion where the other shaft member is supported, and the axis of the other image carrier.

8. An image forming apparatus comprising:

the transfer device according to claim 7; and a fixing unit that fixes the image transferred to a recording medium by the transfer device to the recording medium.

9. An image forming apparatus comprising:

the transfer device according to claim 6; and a fixing unit that fixes the image transferred to a recording medium by the transfer device to the recording medium.

10. An image forming apparatus comprising:

the transfer device according to claim 1; and a fixing unit that fixes the image transferred to a recording medium by the transfer device to the recording medium.

* * * * *